United States Patent
Winterot (10) Patent No.: US 11,372,226 B2
(45) Date of Patent: Jun. 28, 2022

(54) STEREO MICROSCOPE OF THE GREENOUGH TYPE AND RELATED OPTICAL ASSEMBLY VARIABLE IMAGING SYSTEM

(71) Applicant: Carl Zeiss Microscopy GmbH, Jena (DE)

(72) Inventor: Johannes Winterot, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 308 days.

(21) Appl. No.: 16/660,313

(22) Filed: Oct. 22, 2019

(65) Prior Publication Data

US 2020/0132978 A1 Apr. 30, 2020

(30) Foreign Application Priority Data

Oct. 30, 2018 (DE) .......................... 102018218569.7

(51) Int. Cl.
*G02B 21/22* (2006.01)
*G02B 21/04* (2006.01)
*G02B 21/36* (2006.01)

(52) U.S. Cl.
CPC ............. *G02B 21/22* (2013.01); *G02B 21/04* (2013.01); *G02B 21/361* (2013.01)

(58) Field of Classification Search
CPC ...... G02B 21/22; G02B 21/04; G02B 21/361; G02B 21/00; G02B 21/0004; G02B 21/0012; G02B 21/18; G02B 21/20; G02B 21/36; G02B 21/362

USPC ....... 359/376, 362, 363, 368, 369, 372, 373, 359/374, 375, 377, 378, 379, 380, 384, 359/433, 434
See application file for complete search history.

(56) References Cited

U.S. PATENT DOCUMENTS

| | | | |
|---|---|---|---|
| 4,059,336 A | * | 11/1977 | Hopkins ................ G02B 21/04 359/366 |
| 4,518,231 A | | 5/1985 | Muchel et al. |
| 4,838,671 A | | 6/1989 | Papritz et al. |
| 5,227,914 A | | 7/1993 | Toyoharu et al. |
| 5,530,587 A | | 6/1996 | Sander et al. |
| 2013/0044369 A1 | | 2/2013 | Srikanth |
| 2017/0199365 A1 | * | 7/2017 | Czaniera ................ G02B 21/22 |

FOREIGN PATENT DOCUMENTS

| | | |
|---|---|---|
| DE | 69 26 292 | 1/1970 |
| DE | 2 02 074 A5 | 8/1983 |
| DE | 32 17 776 C2 | 11/1983 |
| DE | 43 15 630 A1 | 11/1994 |

(Continued)

OTHER PUBLICATIONS

German Search Report, with translation thereof, for corresponding DE Appl No. 10 2018 218 569.7, dated Feb. 21, 2019.

(Continued)

*Primary Examiner* — Arnel C Lavarias
(74) *Attorney, Agent, or Firm* — Fish & Richardson P.C.

(57) ABSTRACT

A stereo microscope of the Greenough type includes two separate imaging channels. The imaging channels have, starting from a common reference plane, beam paths that extend parallel to one another. An optical assembly sets a stereo angle in a Greenough stereo microscope.

20 Claims, 5 Drawing Sheets

(56) References Cited

FOREIGN PATENT DOCUMENTS

| | | |
|---|---|---|
| DE | 199 43 015 A1 | 3/2001 |
| DE | 10 312 681 A | 10/2004 |
| DE | 10 2006 036 768 A1 | 3/2007 |
| DE | 10 2010 030 637 A1 | 12/2011 |
| EP | 2 302 437 B1 | 7/2014 |
| GB | 928 205 A | 6/1963 |

OTHER PUBLICATIONS

Chinese Office Action, with English translation, for corresponding Chinese patent application No. 2019 1104 1055.6, dated Jun. 2, 2021.

Chinese Office Action, with English translation, for corresponding Chinese patent application No. 201911041055.6, dated Jan. 25, 2022.

* cited by examiner

STEREO MICROSCOPE OF THE GREENOUGH TYPE AND RELATED OPTICAL ASSEMBLY VARIABLE IMAGING SYSTEM

FIELD

The disclosure relates to a stereo microscope of the Greenough type. The disclosure also relates to an optical assembly for setting a stereo angle in a stereo microscope of the Greenough type. In addition, the disclosure relates to a variable imaging system for a stereo microscope of the Greenough type.

BACKGROUND

There are different types of stereo microscopes. In the Greenough type, as it is known, both beam paths are completely separate from one another in terms of construction. The Abbe type, as it is known, has a common main objective for both beam paths.

Greenough stereo microscopes are known for example from DE 199 43 015 A1 and DE 43 15 630 A1. Further stereo microscopes are known from DE 10 2006 036 768 A1, DE 32 17 776 C2 and DE 69 26 292.

SUMMARY

The present disclosure seeks to improve a stereo microscope of the Greenough type.

In one aspect, the disclosure provides a stereo microscope of the Greenough type. The stereo microscope includes two separate imaging channels. The imaging channels have, starting from a common reference plane, beam paths that extend parallel to one another.

The core of the disclosure is to parallelize the beam paths of the two imaging channels in a stereo microscope of the Greenough type. This is in particular understood to mean that the beam paths of the two separate imaging channels run parallel to one another starting from a common reference plane. For parallellizing the beam paths of the two imaging channels, in particular an optical assembly, which will be explained in more detail below, is provided.

A parallel profile of the beam paths of the two separate imaging channels is advantageous for the arrangement of the optical component parts in the beam path downstream of the common reference plane.

The reference place, downstream of which the beam paths extend parallel to one another is located on the object side of an objective assembly. The beam paths of the two imaging channels thus extend parallel to one another in particular in the region of the objective assembly. Hereby, the construction of the objective assembly is simplified and at the same time improved.

In accordance with one aspect of the disclosure, the stereo microscope has an adjustable stereo angle.

The stereo angle is adjustable in particular by way of an optical assembly. The stereo angle is adjustable in particular with an optical assembly that is arranged in the beam path of the microscope between the focal planes of the two imaging channels and the objectives thereof.

The variably adjustable stereo angle offers greater flexibility.

According to a further aspect of the disclosure, the optical assembly for setting the stereo angle is configured such that an intersection line of the object planes of the two imaging channels remains spatially fixed when adjusting the stereo angle.

This results in obvious advantages when observing objects under different stereo angles. In particular, one result is that refocusing can be dispensed with when adjusting the stereo angle.

In accordance with a further aspect of the disclosure, the stereo microscope has a modular construction.

This further increases the flexibility of the stereo microscope.

In accordance with a further aspect of the disclosure, the beam paths of the imaging channels are embodied in each case as infinity optical systems. This should in particular be understood to mean that the objectives in each case do not produce real intermediate images but have an image distance set to infinity. In other words, the two imaging channels have, on the image side of the objectives thereof, the shape of parallel beams.

To create a real intermediate image, tube lenses can be provided in each case in the beam paths of the imaging channels.

By realizing the imaging channels as infinity optical systems, that is to say by providing what is known as an infinite space, the flexibility of the stereo microscope is increased further. The infinite space is available in particular for the arrangement of optical assemblies and/or additional devices.

In accordance with a further aspect of the disclosure, the stereo microscope discloses a variable imaging system for setting and changing the magnification. The variable imaging system discloses in particular a magnification changer, in particular an afocal magnification changer.

This also increases the flexibility of the stereo microscope further.

The disclosure also seeks to provide an optical assembly for setting a stereo angle in a stereo microscope of the Greenough type.

In an aspect, the disclosure provides an optical assembly having two separate imaging channels in each case with a first mirror and a second mirror each serving for transferring imaging light from an object plane into a reference plane, wherein the optical axes enclose a stereo angle that is adjustable, wherein the reference plane is identical for both imaging channels.

The optical assembly is in particular an optical assembly for a stereo microscope of the Greenough type according to the preceding description. A microscope of this type will also be referred to below simply as a Greenough stereo microscope.

The stereo angle is also referred to as the convergence angle. It indicates the angle by which the two object-side beam paths of the Greenough stereo microscope, in particular the object-side optical axes thereof, are inclined with respect to one another. It exactly corresponds to the angle which the focal planes of the two imaging channels enclose between them.

The two mirrors of the imaging channels in each case form a mirror stairway, in particular a mirror stairway with displaceable mirrors. The mirror stairway can include in particular in each case exactly two mirrors per imaging channel. This simplifies the construction of the optical assembly.

Preferably, all components of the imaging channels are arranged mirror-symmetrically with respect to a center plane.

The optical assembly can be a structurally separate component part. It can also be a component part of the objective system of the Greenough stereo microscope. The mirror stairway can also be formed merely by the arrangement of the mirrors in a main body of the Greenough stereo microscope, in particular without it forming a separate component part.

It is particularly advantageous that the reference plane into which the imaging light is transferred by way of the two mirror stairways is identical for both imaging channels. It is particularly possible hereby to align the subsequent beam paths of the imaging channels parallel to one another.

A corresponding optical assembly is advantageous even without the functionality of an adjustable stereo angle.

In accordance with an aspect of the disclosure, the second mirror is pivotable in each case about a spatially fixed axis that extends parallel to the reference plane. The pivot axis extends in particular through the reflection face of the mirror. Therefore, the mirror is also referred to as a spatially fixed mirror.

The pivot axis extends in particular through a center line of the mirror.

In particular the location of the optical axis of the subsequent beam path can be specified, in particular fixedly specified, by the spatially fixed pivot axis.

According to a further aspect of the disclosure, the first mirror of the optical assembly is displaceable such that it has a constant distance from the respective object plane during the displacement. The distance is measured here in particular from a center line of the second mirror. The guide element for positioning of the first mirror can in that case have a circular shape that is concentric with the object.

The second mirror has in particular a constant average distance from the respective object plane.

The second mirror can likewise be pivotable about a pivot axis that extends parallel to the reference plane. In addition, it can be linearly displaceable, that is to say the pivot axis of the second mirror can undergo a location change upon the pivoting thereof.

More complex configurations having more than two mirrors per imaging channel are possible in principle.

In accordance with a further aspect of the disclosure, the first and/or second mirror are in each case plane mirrors. As a result, a particularly aberration-free transfer of the imaging light from the object plane into the reference plane is made possible.

In accordance with a further aspect of the disclosure, the convergence angle between the optical axes of the two imaging channels is settable in the range from 10° to 15°. In addition, it is preferably adjustable such that perpendicular observation becomes possible. It is possible here to use merely one of the two imaging channels for perpendicular observation. Alternatively, the two imaging channels can image different object field regions, in particular different axis points, in the case of perpendicular observation.

The two mirrors of the mirror stairways are in each case arranged in particular such that the axially parallel center ray deflected by the two mirrors has an adjustable angle between 5° and 15° with respect to the device axis. For at least one of the channels, a setting to 0° is possible.

The two mirrors of the mirror stairways are in particular in each case arranged such that they can enclose an adjustable angle in the range from 0° to 10°, in particular in the range from 5° to 7.5°, and preferably also an angle of 0°, between them.

The stereo angle is adjusted in particular in the beam path between the object field the imaging optical unit, in particular between the object field and the objective assembly. Hereby, it is in particular possible to form the imaging optical unit independently of the stereo angle. The imaging optical unit in particular does not need to be adapted to the respective setting of the stereo angle.

The Greenough stereo microscope in particular includes two structurally entirely separate imaging channels. This is in particular understood to mean that the imaging elements, in particular the lenses, are used in each case only for one of the two imaging channels. It is hereby possible to achieve a better imaging quality.

The Greenough stereo microscope in particular includes an optical assembly for setting a stereo angle, in particular an optical component part or an arrangement of mirrors, in particular in mirror stairways, in accordance with the preceding description.

Said mirror stairways are arranged in particular between the object field and the imaging optical unit, in particular the objective assembly.

In accordance with a further aspect of the disclosure, the imaging channels downstream of the optical component part or downstream of the mirror stairway, in particular downstream of the reference plane, have at least partially parallel optical axes.

They can be aligned parallel over their entire length in particular in the region of the objective assembly.

The two imaging channels can have in particular a common, in particular an identical, intermediate image plane. In other words, the intermediate image plane of the left and right imaging channels can coincide.

In accordance with a further aspect of the disclosure, the mirrors of the two imaging channels are mounted such that the mirrors of the same imaging channel are coupled, in particular are displaced synchronously with one another. They are in particular mounted such that the mirrors, arranged symmetrically to the center plane, of the two imaging channels are coupled, in particular are displaced synchronously with one another. They are in particular arranged such that the mutually corresponding mirrors of the two imaging channels are in each case displaced symmetrically with respect to the center plane.

The disclosure further seeks to improve a variable imaging system for a Greenough stereo microscope.

In an aspect, the disclosure provides a variable imaging system in which lenses of the left imaging channel and lenses of the right imaging channel are arranged on a common displacement device.

A variable imaging system is here understood to mean in particular an imaging system with a variable scale number, that is to say a variable magnification. For details, reference is made to DE 199 43 015 A1 and DE 43 15 630 A1, for example. The variable imaging system is formed in particular by a zoom objective.

The variable imaging system is in particular a variable imaging system for a stereo microscope of the Greenough type according to the preceding description. In accordance with a further aspect of the disclosure, a plurality of common displacement devices can likewise be provided. By way of example, the displacement devices can be optical carriages. They can serve in each case to displace lens groups.

By arranging lenses of the left imaging channel and of the right imaging channel on the common displacement device, the complexity for the guidance and driving of the displacement of the lenses or lens groups can be reduced.

The respective lenses are in particular in each case fixedly arranged on the common displacement device. The structural outlay is thereby further reduced.

The lenses arranged on the common displacement device are displaceable by way of the latter in particular in each case in the direction of the optical axis of the respective imaging channel. The lenses of the left imaging channel are here in particular displaceable parallel to the lenses of the right imaging channel. The construction of the variable imaging system is improved hereby, too, in particular simplified.

BRIEF DESCRIPTION OF THE DRAWINGS

Further advantages and details of the disclosure emerge from the description of exemplary embodiments with reference to the drawings, in whichs.

DESCRIPTION OF EXEMPLARY EMBODIMENTS

First, optical component parts of the imaging optical unit of a stereo microscope of the Greenough type 1 will be described below with reference to FIG. 1. The optical component parts are arranged in a main body 2, which is indicated only highly schematically in FIG. 1.

The imaging optical unit discloses, in particular starting from the two object planes 3*l*, 3*r* of the left and right imaging channels 4*l*, 4*r*, an optical component part 5 for setting the stereo angle b. The stereo angle b is here understood to be, as is illustrated in FIG. 1, the angle between the center rays of the left imaging channel 4*l* and the right imaging channel 4*r*.

The optical component part 5 can in particular have a mirror stairway 6*l*, 6*r* for each of the imaging channels 4*l*, 4*r*. The mirror stairways 6*l*, 6*r* in each case have a first mirror 12*l*, 12*r* and a second mirror 13*l*, 13*r*.

The optical component part 5 will be described in yet more detail below.

An objective assembly 7 is arranged downstream of the optical component part 5 in the beam path.

Furthermore arranged downstream of the objective assembly 7 in each of the imaging channels 4*l*, 4*r* is in each case an optical device 8 for adapting the beam paths thereof to the eye distance of the observer and/or for image erection. In particular, a tube system serves as the optical device 8. The optical device 8 can in each case have an even number of at least four reflective prism or mirrors faces. In addition to the image erection, the optical device 8 realizes the adaptation of the imaging beam path to the view angle (not illustrated). An intermediate image location, in particular an intermediate image plane 9, is situated downstream of the optical device 8 in the beam path. The intermediate images are observed in each case using an eyepiece 10. FIG. 1 schematically shows in addition in each case one eye pupil 11.

The beam paths of the two imaging channels 4*l*, 4*r* are separate from one another. In particular, they are completely separate. This is to be understood to mean that each of the optical component parts of the stereo microscope of the Greenough type 1 is used only in one of the two imaging channels 4*l*, 4*r*. There are no individual lenses or mirrors that are used both in the left imaging channel 4*l* and in the right imaging channel 4*r*. The stereo microscope of the Greenough type 1 is therefore also referred to simply as a Greenough stereo microscope 1.

Figure 4A:
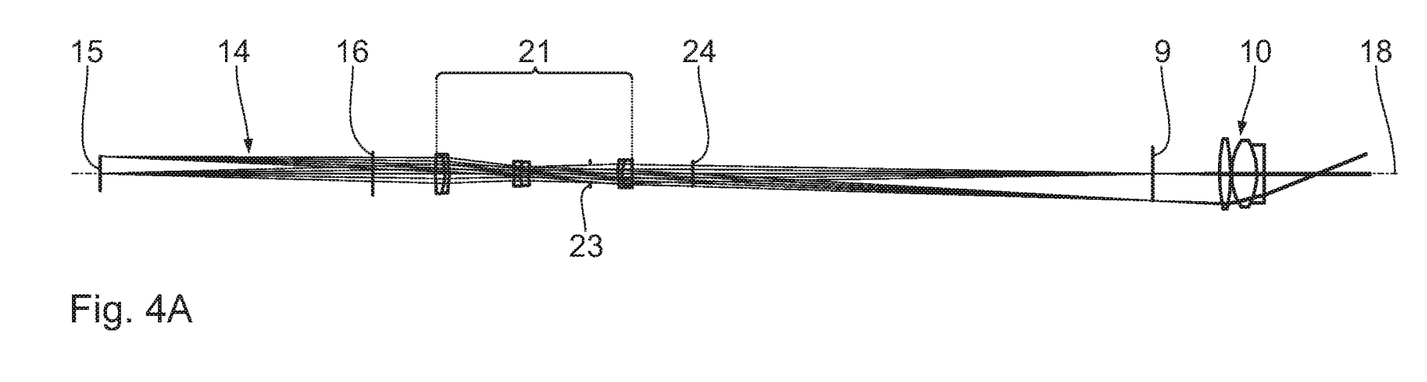
Figure 4B:
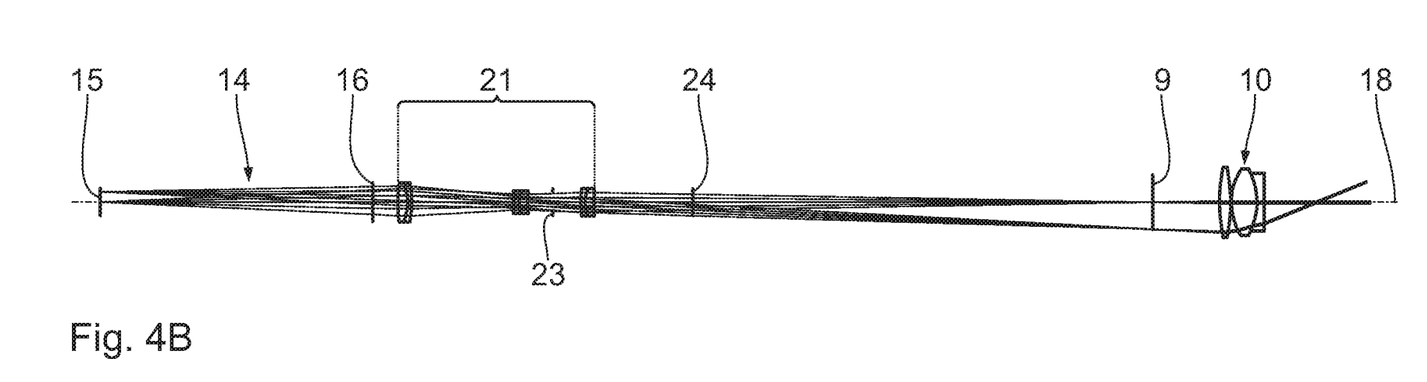

All optical components of the imaging channels 4*l*, 4*r* are arranged symmetrically with respect to a center plane 17. Imaging between the object plane and the intermediate image plane is not limited to the embodiment illustrated in FIG. 4. In particular, it is possible to realize imaging using an objective, an afocal magnification changer and a tube lens in each channel. The distances adjacent to the afocal magnification changer are suitable for dividing the system into modules and in this way for attaining a modular stereo microscope of the Greenough principle. A multiplicity of configurations is realizable and increases the flexibility over a classical Greenough stereo microscope of analogous type, as is known for stereo microscopes of the Abbe type.

On the object side, the beam paths of the two imaging channels 4*l*, 4*r* are tilted with respect to one another by the stereo angle b, also referred to as the convergence angle b.

This stereo angle b is adjustable using the optical component part 5. This will be explained in more detail below with reference to FIGS. 2 and 3.

Figure 2:
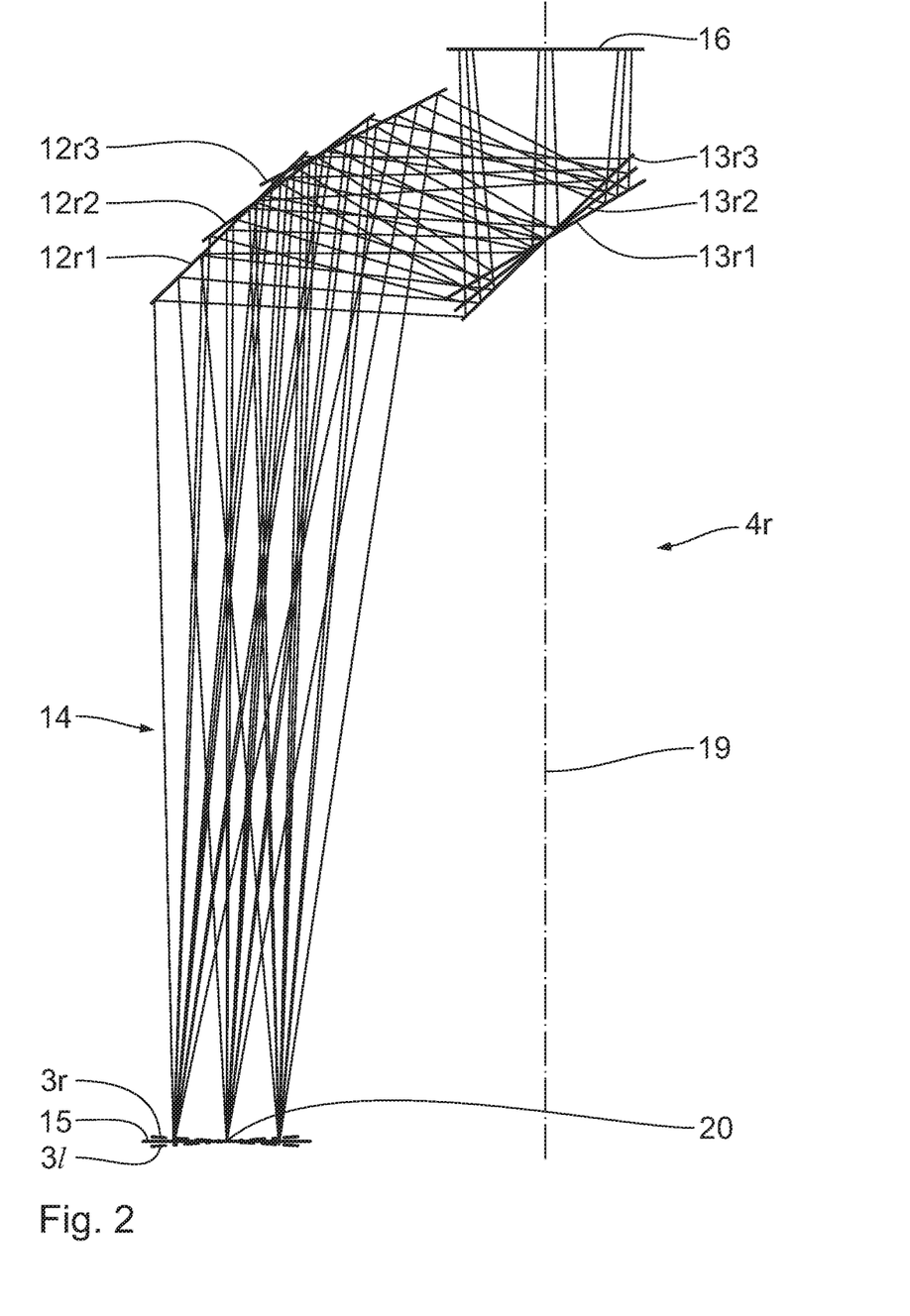

In FIG. 2, beam paths are illustrated by way of example in the right imaging channel 4*r* for different positions of the mirrors 12*r*, 13*r* of the mirror stairway 6*r*. The different positioning of the mirrors 12*r*, 13*r* are indicated by indices (1, 2, 3).

For the sake of simplicity, only the mirror stairway 6*r* in the right imaging channel 4*r* will be described below. The mirror stairway 6*l* in the left imaging channel 4*l* is embodied accordingly.

The mirrors 12*l*, 12*r*, 13*l*, 13*r* of the mirror stairways 6*l*, 6*r* each serve for transferring imaging light 14 from an object plane 15 into a reference plane 16. In FIG. 1, the reference plane 16 is identical for both imaging channels 4*l*, 4*r*.

The mirrors 12*l*, 13*l* and 12*r*, 13*r* are in particular in each case plane mirrors.

In the variant illustrated in FIG. 2, the second mirror 13*l*, 13*r* is pivotable in each case about an axis that extends perpendicular to the axis 19 of the left and right imaging beam paths within the objective assembly 7. The axis about which the second mirror 13*l*, 13*r* is pivotable in each case extends through the reflection face of the mirror 13*l*, 13*r*. In particular, it extends through a center line of the mirror 13*l*, 13*r*. The center line of the mirror 13*l*, 13*r* is thus spatially fixed when the latter is pivoted. It defines the location of an optical axis 19 in the two beam paths of the objective assembly 7.

The imaging channels 4*l*, 4*r* have, at least starting from the reference plane 16, optical axes that extend parallel to one another.

The respective first mirror 12*l*, 12*r* of the mirror stairway 6*l*, 6*r* in the variant according to FIG. 2 is mounted such that, when the second mirror 13*l*, 13*r* is pivoted, it likewise pivots about the axis about which the second mirror 13*l*, 13*r* is pivotable in each case and is displaced at the same time.

The mirrors 131 and 12r, 13r are to this end arranged in each case on a displacement device, which is not illustrated in the figure.

A further variant of the mirror stairway 6 will be described below with reference to FIG. 3. The general details of this variant correspond to those of the mirror stairway 6 according to FIG. 2, with reference hereby being made to the description thereof.

In deviation of the variant according to FIG. 2, the pivot axis about which the second mirror 13r is pivotable is not spatially fixed when the mirror 13r is pivoted. It is displaced in a linear manner in particular in a direction parallel to the optical axis 19 when the mirror 13r is pivoted. The pivot axis can also have a displacement component extending transversely to the optical axis 19 when the mirror 13r is pivoted. The mirror 13r is displaced in the case of the pivoting in particular such that a specific point on the surface of the mirror 13r, in particular the center of the reflection face, is displaced parallel to a plane that is defined by the optical axes 19 of the two beam paths of the objective assembly 7.

Figure 3:
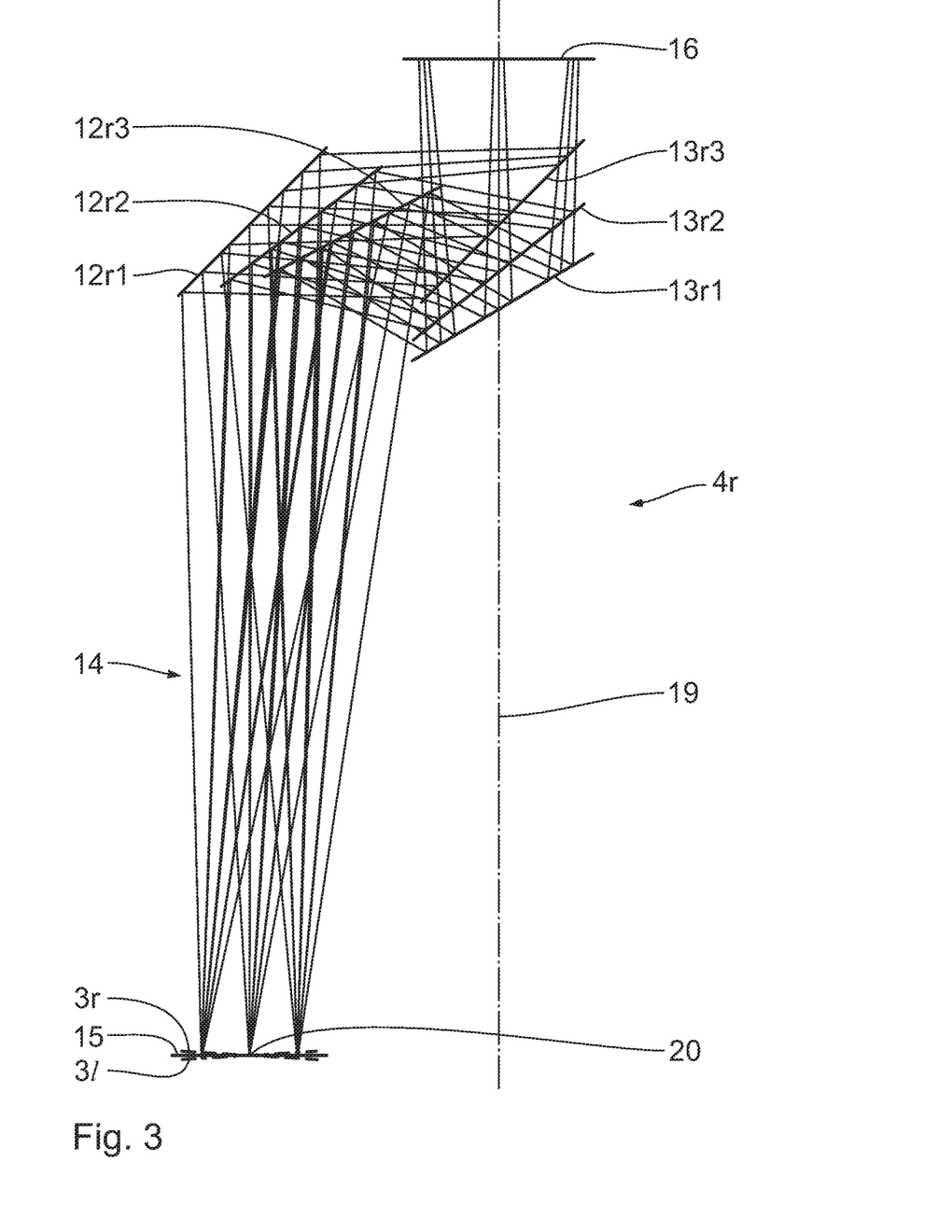
FIG. 3 shows an illustration in accordance with FIG. 2 of a further variant of the mirror stairway, FIGS. 4A, 4B schematically show by way of example two beam paths in the imaging beam path of an imaging channel of a stereo microscope according to FIG. 1 with different positions of a variable setting system.

In this variant according to FIG. 3, a center line of the mirror 12r has a constant distance from a central object field point 20 in the case of the displacement of the mirror 12r.

The mirror 12r has in particular a constant average distance from the object plane 15 in the case of the displacement.

Figure 5:
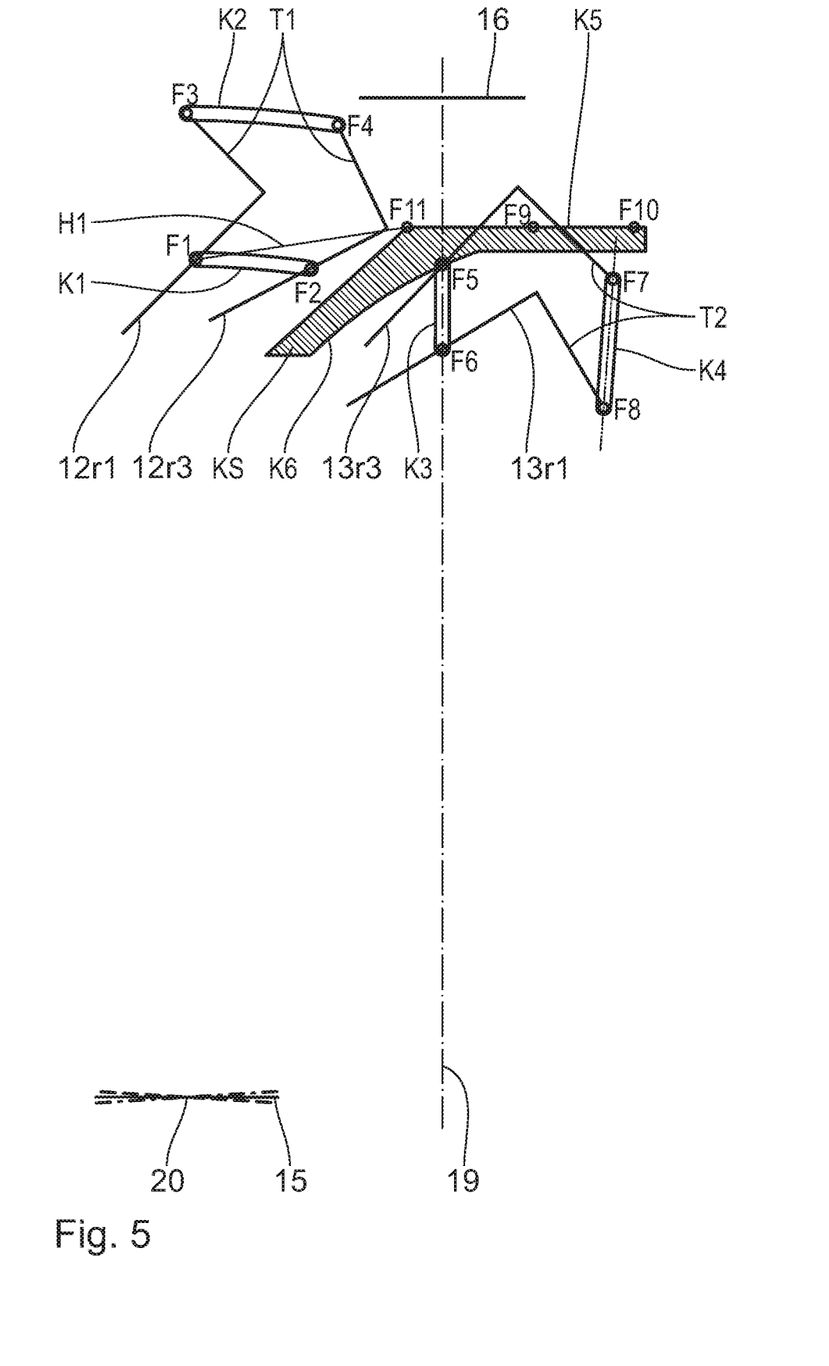
FIG. 5 shows by way of example one possible way in which the variant of the mirror stairway illustrated in FIG. 3 can be realized.

The text below, with reference to FIG. 5, will describe by way of example how the displaceability of the mirrors 12r, 13r and of the mirror stairway 6r is able to be realized.

The mirror 12r is displaceable with respect to the central objective field point 20 in the object plane 15. FIG. 5 schematically illustrates a guide cam K1 that is concentric with the central object field point 20. The mirror 12r is displaceable in particular from a first displacement position with the guide and pivot point F1 via second displacement positions, not illustrated, into a third displacement position. In particular, it is continuously displaceable. A guide and pivot point of the mirror 12r in the third displacement position is designated F2.

A follower T1 is fixedly connected to the mirror 12r. The follower T1 touches a spatially fixed cam K2. The follower T1 moves, upon displacement of the mirror 12r from the first into the third displacement position, from a touch position F3 to a touch position F4.

The guide and touch elements are embodied such that, in the case of a movement initiated from the outside, the pivot point of the mirror 12r follows the cam K1 and the touch point of the follower T1 follows the cam K2.

The mirror 13r is in this case moved synchronously with the mirror 12r. The mirror 13r is displaced in particular from a first end position (13r1), via intermediate positions that are not illustrated in the figure, into a second end position (13r3). In this case, a guide and pivot point of the mirror 13r moves from the position F5 into the position F6 along the guide K3 that extends parallel to the optical axis 19. A follower T2 that is fixedly connected to the mirror 13r here touches a spatially fixed cam K4. The follower T2 moves in particular along the cam K4 from the touch position F7 to the touch position F8.

The guide and touch elements are embodied such that, in the case of a movement initiated from outside, the guide and pivot point of the mirror 13r follows the cam K3 and the follower T2 follows the cam K4.

Along a spatially fixed guide, described by the straight line K5, a cam disk KS is arranged displaceably on a guide point F9. The cam disk KS carries the cam K6.

The mirror 13r touches the cam disk KS at the cam K6 in the touch point F5. The guide and pivot point F1 is rotatably connected via a lever H1, in particular in an articulated fashion, to the cam disk KS at a point F11. With the movement of the mirror 12r from the position 12r1 into the position 12r3, the cam disk KS is displaced. Here, the guide point F9 travels to the position F10. Here, the guide and pivot point F5 of the mirror 13r travels along the cam K3 and the displaced cam K6 to the position F6.

The cams K1 to K6 are designed such that all mirror positions $12r_i$, $13r_i$ of the mirrors 12r and 13r are adjustable coupled by an actuating movement initiated from outside.

Due to the fact that the reference plane 16 for both imaging channels 4l, 4r is identical, it is possible to arrange the displaceable optical component parts, in particular the displaceable lens groups of the left and right imaging channels 4l, 4r of the objective assembly 7 on a common carriage 21, 22. The carriages 21, 22 are an example of a mechanical element of a displacement device.

Figure 1:
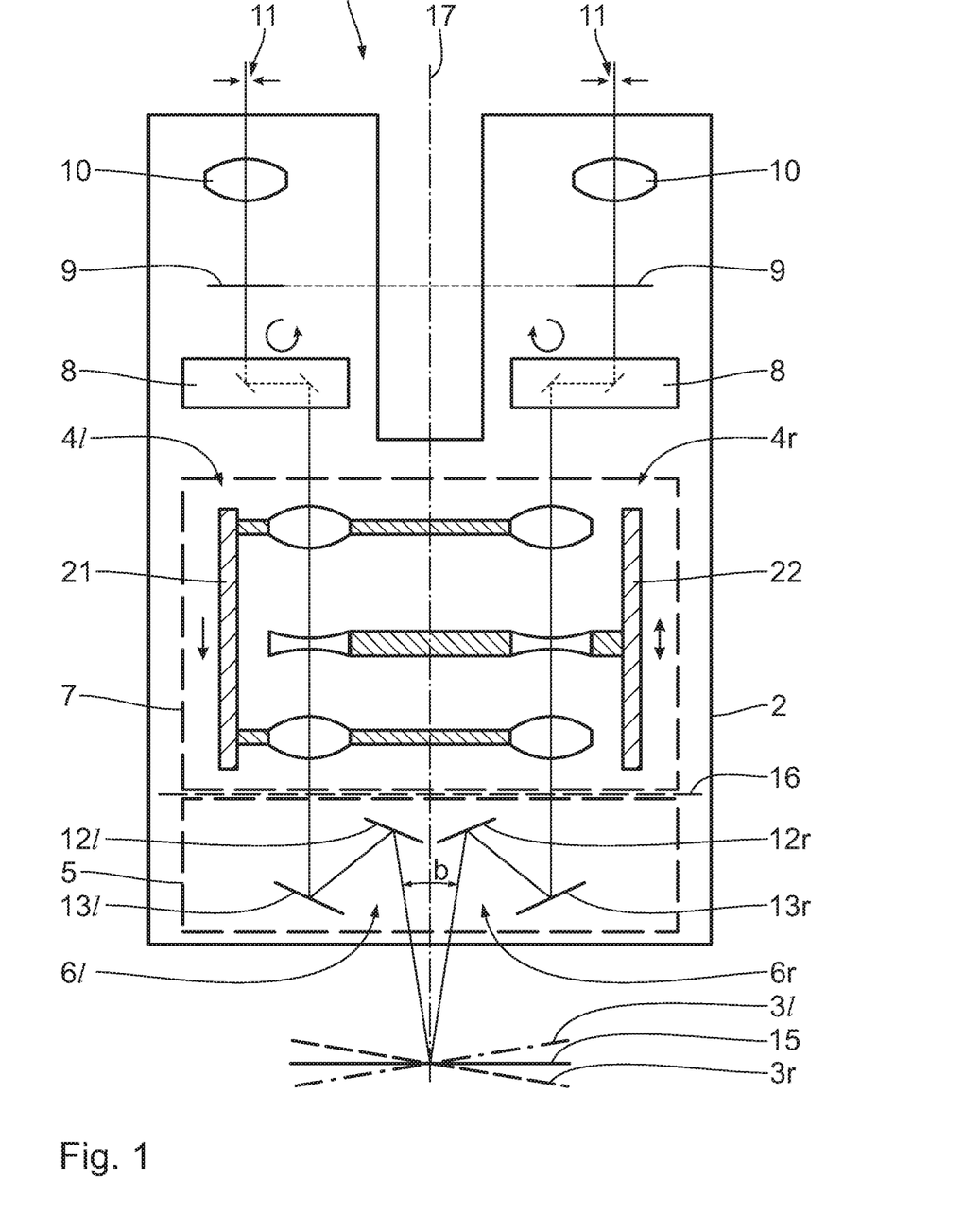
FIG. 1 schematically shows the construction and beam path of the imaging light in a stereo microscope of the Greenough type according to a first variant, FIG. 2 schematically shows beam paths in the region of a mirror stairway according to a first variant in three different positions for setting different stereo angles.

The guides in FIG. 1 are referenced by way of example to the variants in FIGS. 4A and 4B. First and third lens groups of the right and left channels are mounted and driven on a common carriage 21. Second lens groups of the right and left channels are mounted and driven together on a second carriage 22. A forced coupling exists between the drive for carriage 21 and carriage 22.

It is also possible to arrange only some of the lenses of the left imaging channel 4l and of the right imaging channel 4r on a common carriage 22, while other lenses of one imaging channel 4l, 4r are arranged, in particular displaceably, independently of the corresponding lenses of the respective other imaging channel 4r, 4l.

By arranging optical component parts of the objective assembly 7, in particular of the left imaging channel 4l and of the right imaging channel 4r on a common carriage 22, the complexity for guiding and driving can be reduced. On account of the arrangement on a common displacement device, it is in particular possible to ensure that the respective lenses of the left imaging channel 4l and of the right imaging channel 4r are displaced together, in particular synchronously, and parallel to one another.

FIGS. 4A and 4B show by way of example different arrangements of the lens group in one of the imaging channels 4l, 4r of the objective assembly 7.

In addition, a stop 23 is shown in the exemplary beam paths of FIGS. 4A and 4B.

In addition, FIGS. 4A and 4B show the location of a further reference plane 24. The reference plane 24 describes the end of the installation space of the objective assembly 7 and the transition thereof to the optical device 8.

Due to the parallel guiding of the beam paths in the two imaging channels 4l, 4r starting from the reference plane 16, a variation of the eye distance of the observer is possible in a simple manner without a disturbing image rotation.

Instead of one or both of the eyepieces 10, the image produced by the imaging optical unit, in particular the intermediate image, can also be recorded using one or more cameras.

What is claimed is:

1. A microscope, comprising:
   a first imaging channel having a first beam path; and
   a second imaging channel having a second beam path,
   wherein:
      the first and second imaging channels are separate channels;
      starting from a common reference plane, the first and second beam paths are parallel to each other;

the stereo angle between the first and second imaging channels is adjustable in a range from 0° to 20°; and
the microscope is a Greenough type stereo microscope.

2. The microscope of claim 1, further comprising an optical assembly configured to set a stereo angle, wherein the optical assembly is configured so that an intersection line of object planes of the first and second imaging channels remains spatially fixed when adjusting the stereo angle.

3. The microscope of claim 1, wherein the microscope is a modular microscope.

4. The microscope of claim 1, wherein each of the first and second beam paths is as an infinity optical system.

5. The microscope of claim 1, further comprising a displacement device, wherein:
the first imaging channel comprises a first plurality of lenses;
the second imaging channel comprises a second plurality of lenses;
at least some of the first plurality of lenses are usable only in the first imaging channel;
at least some of the second plurality of lenses are usable only in the second imaging channel; and
at least some of the first plurality of lenses and at least some of the second plurality of lenses are on the displacement device.

6. The microscope of claim 1, wherein:
the first imaging channel comprises a first plurality of lenses;
the second imaging channel comprises a second plurality of lenses;
at least some of the first plurality of lenses are usable only in the first imaging channel; and
at least some of the second plurality of lenses are usable only in the second imaging channel.

7. The microscope of claim 1, wherein:
the first imaging channel comprises a first mirror and a second mirror;
the second imaging channel comprises a third mirror and a fourth mirror;
the first mirror is configured to transfer imaging light from an object plane into a reference plane;
the second mirror is configured to transfer imaging light from the object plane into the reference plane;
the third mirror is configured to transfer imaging light from the object plane into the reference plane;
the fourth mirror is configured to transfer imaging light from the object plane into the reference plane;
on an object side, the first and second imaging channels enclose an adjustable stereo angle; and
the optical assembly is an optical assembly to set a stereo angle in the microscope.

8. The microscope of claim 7, wherein the second mirror is pivotable about an axis extending parallel to the reference plane, wherein the axis is spatially fixed when the second mirror is pivoted.

9. The microscope of claim 7, wherein the first mirror is displaceable so that the first mirror has a constant average distance from the object plane during the displacement.

10. The microscope of claim 7, wherein the first mirror is a plane mirror.

11. The microscope of claim 7, further comprising an imaging system, wherein:
the imaging system comprises:
a displacement device;
a first a plurality of lenses along the first imaging channel; and
a second plurality of lenses along the a second imaging channel;
at least some of the first plurality of lenses are usable only in the first imaging channel;
at least some of the second plurality of lenses are usable only in the second imaging channel;
at least some of the first plurality of lenses and at least some of the second plurality of lenses are supported by the displacement device; and
the imaging system is a variable imaging system.

12. The microscope of claim 11, wherein:
the second mirror is pivotable about an axis extending parallel to the reference plane;
the axis is spatially fixed when the second mirror is pivoted;
the first mirror is displaceable so that the first mirror has a constant average distance from the object plane during the displacement; and
the first mirror is a plane mirror.

13. The microscope of claim 12, wherein the microscope is a modular microscope.

14. A microscope, comprising:
a first imaging channel having a first beam path; and
a second imaging channel having a second beam path, wherein:
the first and second imaging channels are separate channels;
starting from a common reference plane, the first and second beam paths are parallel to each other;
the microscope is a stereo microscope of the Greenough type;
the first imaging channel comprises a first mirror and a second mirror;
the second imaging channel comprises a third mirror and a fourth mirror;
the first mirror is configured to transfer imaging light from an object plane into a reference plane;
the second mirror is configured to transfer imaging light from the object plane into the reference plane;
the third mirror is configured to transfer imaging light from the object plane into the reference plane;
the fourth mirror is configured to transfer imaging light from the object plane into the reference plane;
on an object side, the first and second imaging channels enclose an adjustable stereo angle;
the optical assembly is an optical assembly to set a stereo angle in the microscope;
the second mirror is pivotable about an axis extending parallel to the reference plane; and
the axis is spatially fixed when the second mirror is pivoted.

15. The microscope of claim 14, wherein the first mirror is displaceable so that the first mirror has a constant average distance from the object plane during the displacement.

16. The microscope of claim 15, wherein the first mirror is a plane mirror.

17. The microscope of claim 16, further comprising an imaging system, wherein:
the imaging system comprises:
a displacement device;
a first a plurality of lenses along the first imaging channel; and
a second plurality of lenses along the a second imaging channel;
at least some of the first plurality of lenses are usable only in the first imaging channel;

at least some of the second plurality of lenses are usable only in the second imaging channel;

at least some of the first plurality of lenses and at least some of the second plurality of lenses are supported by the displacement device; and the imaging system is a variable imaging system.

18. The microscope of claim 14, wherein the first mirror is a plane mirror.

19. The microscope of claim 18, further comprising an imaging system, wherein:

the imaging system comprises:
- a displacement device;
- a first a plurality of lenses along the first imaging channel; and
- a second plurality of lenses along the a second imaging channel;

at least some of the first plurality of lenses are usable only in the first imaging channel;

at least some of the second plurality of lenses are usable only in the second imaging channel;

at least some of the first plurality of lenses and at least some of the second plurality of lenses are supported by the displacement device; and the imaging system is a variable imaging system.

20. The microscope of claim 14, further comprising an imaging system, wherein:

the imaging system comprises:
- a displacement device;
- a first a plurality of lenses along the first imaging channel; and
- a second plurality of lenses along the a second imaging channel;

at least some of the first plurality of lenses are usable only in the first imaging channel;

at least some of the second plurality of lenses are usable only in the second imaging channel;

at least some of the first plurality of lenses and at least some of the second plurality of lenses are supported by the displacement device; and the imaging system is a variable imaging system.

* * * * *

UNITED STATES PATENT AND TRADEMARK OFFICE
CERTIFICATE OF CORRECTION

PATENT NO. : 11,372,226 B2
APPLICATION NO. : 16/660313
DATED : June 28, 2022
INVENTOR(S) : Johannes Winterot It is certified that error appears in the above-identified patent and that said Letters Patent is hereby corrected as shown below:

In the Specification

Column 1, Line 43, delete "parallellizing" insert -- parallelizing --.

Column 5, Line 15, delete "whichs:" insert -- which: --.

Column 6, Line 16-26, delete "Imaging between the object plane and the intermediate image plane is not limited to the embodiment illustrated in figure 4. In particular, it is possible to realize imaging using an objective, an afocal magnification changer and a tube lens in each channel. The distances adjacent to the afocal magnification changer are suitable for dividing the system into modules and in this way for attaining a modular stereo microscope of the Greenough principle. A multiplicity of configurations is realizable and increases the flexibility over a classical Greenough stereo microscope of analogous type, as is known for stereo microscopes of the Abbe type." insert same as new paragraph at Column 6, Line 16.

Column 6, Line 49, delete "131" insert -- 13l --.

Column 6, Line 53, delete "131" insert -- 13l --.

Column 6, Line 54, delete "131" insert -- 13l --.

Column 6, Line 55, delete "131" insert -- 13l --.

Column 6, Line 56, delete "131" insert -- 13l --.

Column 6, Line 63, delete "121" insert -- 12l --.

Column 6, Line 64, delete "61" insert -- 6l --.

Column 6, Line 65, delete "131" insert -- 13l --.

Signed and Sealed this
Sixth Day of September, 2022

Katherine Kelly Vidal
*Director of the United States Patent and Trademark Office*

CERTIFICATE OF CORRECTION (continued)
U.S. Pat. No. 11,372,226 B2

Column 6, Line 66, delete "131" insert -- 131 --.

Column 7, Line 1, delete "131" insert -- 131 --.

In the Claims

Column 9, Line 66, Claim 11, delete "a first a plurality" insert -- a first plurality --.

Column 10, Line 1, Claim 11, delete "the a" insert -- the --.

Column 10, Line 62, Claim 17, delete "a first a plurality" insert -- a first plurality --.

Column 10, Line 64, Claim 17, delete "the a" insert -- the --.

Column 11, Line 13, Claim 11, delete "a first a plurality" insert -- a first plurality --.

Column 11, Line 16, Claim 19, delete "the a" insert -- the --.

Column 12, Line 9, Claim 20, delete "a first a plurality" insert -- a first plurality --.

Column 12, Line 11, Claim 20, delete "the a" insert -- the --.